United States Patent
Luo et al.

(10) Patent No.: US 12,510,971 B2
(45) Date of Patent: Dec. 30, 2025

(54) TOUCH DISPLAY COMPUTING DEVICE WITH RADIO FREQUENCY TOUCH AND GESTURE RECOGNITION

(71) Applicant: Intel Corporation, Santa Clara, CA (US)

(72) Inventors: Hao Luo, Fremont, CA (US); Somnath Kundu, Hillsboro, OR (US); Brent Carlton, Portland, OR (US); Zhen Zhou, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 759 days.

(21) Appl. No.: 17/711,905

(22) Filed: Apr. 1, 2022

(65) Prior Publication Data

US 2022/0229495 A1 Jul. 21, 2022

(51) Int. Cl.
*G06F 3/01* (2006.01)
*G01S 13/89* (2006.01)
*G06F 3/0488* (2022.01)

(52) U.S. Cl.
CPC .............. *G06F 3/017* (2013.01); *G01S 13/89* (2013.01); *G06F 3/0488* (2013.01)

(58) Field of Classification Search
CPC ...... G01S 13/89; G06F 3/017; G06F 3/04166; G06F 3/0488; G06F 3/0412; G06F 3/046; G06F 2203/04108
See application file for complete search history.

(56) References Cited

U.S. PATENT DOCUMENTS

2010/0045635 A1* 2/2010 Soo ........................ G06F 3/0412
345/173
2014/0225838 A1 8/2014 Gupta et al.

OTHER PUBLICATIONS

"3D Gesture Control with GestIC® Technology," M Microchip; accessed Apr. 22, 2022; https://www.microchip.com/en-us/products/touch-and-gesture/solutions-for-3d-gestures; 6 pages.
Antonio Šarolić, et al. "Influence of Human Head and Hand on PIFA Antenna Matching Properties and SAR" SoftCOM 2011, 19th International Conference on Software, Telecommunications and Computer Networks; 6 pages.
Walker, Geoff, "A review of technologies for sensing contact location on the surface of a display," Journal of the SID; 20/8; pp. 413-440; Society for Information Display; Milpitas California, May 15, 2012; 28 pages.
Walker, Geoff, "Fundamentals of Touch Technologies and Applications," IMS Research; accessed Apr. 22, 2022; www.walkermobile.com/SID_2011_Short_Course_S4.pdf; 153 pages.

* cited by examiner

*Primary Examiner* — Deeprose Subedi
(74) *Attorney, Agent, or Firm* — Alliance IP, LLC

(57) ABSTRACT

Techniques for radiofrequency (RF) touch and gesture recognition are disclosed. In the illustrative embodiment, RF transmitters and receivers are connected to data lines and gate lines of a display. RF signals sent on one data or gate line may be scattered to a different data or gate line based on the presence of a nearby object, such as a finger. The amount of scattering on different data or gate lines can be used to determine a location of one or more objects.

25 Claims, 6 Drawing Sheets

TOUCH DISPLAY COMPUTING DEVICE WITH RADIO FREQUENCY TOUCH AND GESTURE RECOGNITION

BACKGROUND

Touch screens are widely used in many displays that allow user interaction, such as cell phones or laptops. Touch screens may be implemented by, e.g., a laminate touch sensing layer on top of the display or a reduced display cell aperture for in-cell pixel sensing. Both of those methods will reduce light emission from a display, requiring a brighter display, higher power consumption, and a shorter battery life.

DETAILED DESCRIPTION

Figure 1:
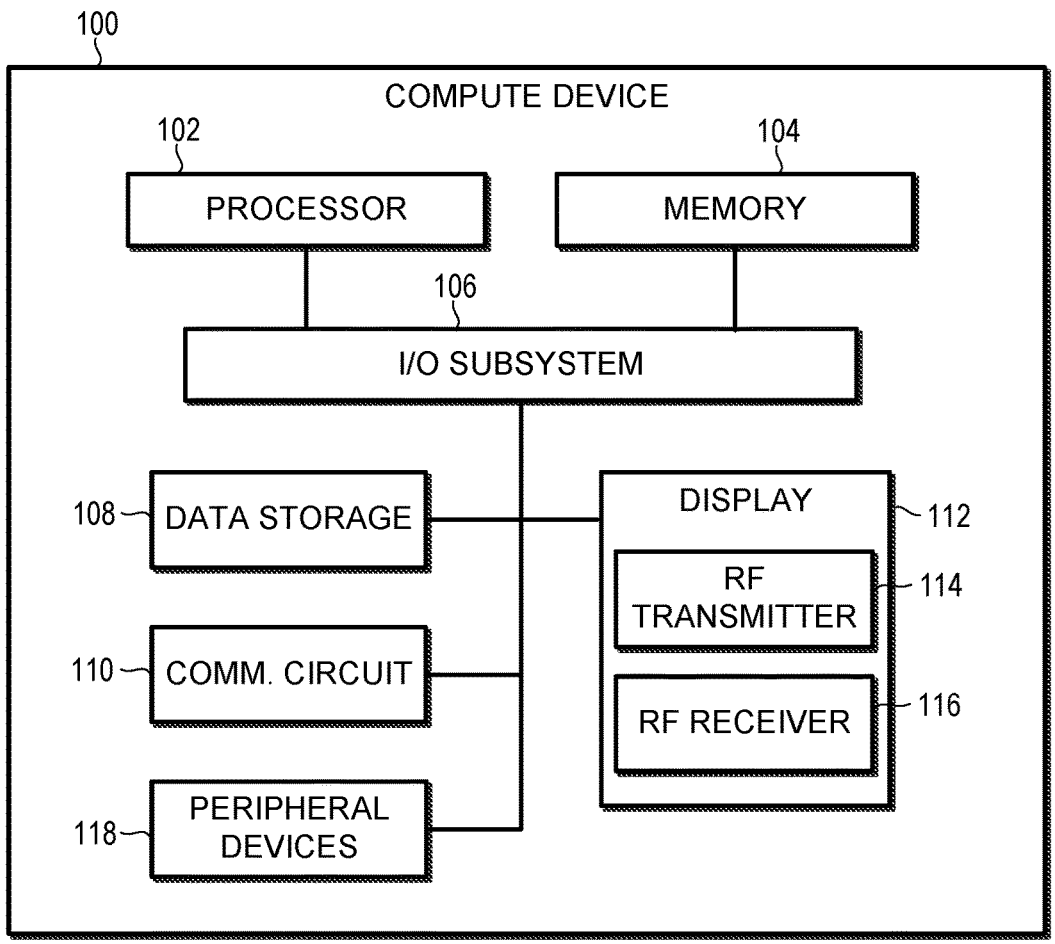
FIG. 1 is a simplified block diagram of at least one embodiment of a compute device for radiofrequency (RF) touch and gesture recognition.

In an illustrative embodiment, a compute device includes a touchscreen display with radiofrequency (RF) transmitters and receivers on display lines. An RF signal transmitted on one display line may be scattered to other display lines due to the presence of a nearby object, such as a finger of a user of the device touching the display. The scattered RF signal may be processed to determine a location of one or more objects on or near the display. In some embodiments, a 3D mapping of one or more objects may be determined based on the scattered signal. The identified objects may be used as an input to the compute device, such as a touch on the screen or a recognized gesture.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a compute device 100 for RF touch and gesture recognition is shown. The compute device 100 may be embodied as any type of compute device. For example, the compute device 100 may be embodied as or otherwise be included in, without limitation, a smartphone, a laptop computer, a consumer electronic device, a cellular phone, a server computer, an embedded computing system, a System-on-a-Chip (SoC), a multiprocessor system, a processor-based system, a desktop computer, a tablet computer, a notebook computer, a network device, a router, a switch, a networked computer, a wearable computer, a handset, a messaging device, a camera device, and/or any other compute device. In some embodiments, the compute device 100 may be located in a data center, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves).

The illustrative compute device 100 includes a processor 102, a memory 104, an input/output (I/O) subsystem 106, data storage 108, a communication circuit 110, a display 112, and one or more peripheral devices 118. In some embodiments, one or more of the illustrative components of the compute device 100 may be incorporated in, or otherwise form a portion of, another component. For example, the memory 104, or portions thereof, may be incorporated in the processor 102 in some embodiments. In some embodiments, one or more of the illustrative components may be physically separated from another component.

The processor 102 may be embodied as any type of processor capable of performing the functions described herein. For example, the processor 102 may be embodied as a single or multi-core processor(s), a single or multi-socket processor, a digital signal processor, a graphics processor, a neural network compute engine, an image processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the compute device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. The I/O subsystem 106 may connect various internal and external components of the compute device 100 to each other with use of any suitable connector, interconnect, bus, protocol, etc., such as an SoC fabric, PCIe®, USB2, USB3, USB4, NVMe®, Thunderbolt®, and/or the like. In some embodiments, the I/O subsystem 106 may form a portion of a system-on-a-chip (SoC) and be incorporated, along with the processor 102, the memory 104, and other components of the compute device 100 on a single integrated circuit chip.

The data storage 108 may be embodied as any type of device or devices configured for the short-term or long-term storage of data. For example, the data storage 108 may include any one or more memory devices and circuits, memory cards, hard disk drives, solid-state drives, or other data storage devices.

The communication circuit 110 may be embodied as any type of interface capable of interfacing the compute device 100 with other compute devices, such as over one or more wired or wireless connections. In some embodiments, the communication circuit 110 may be capable of interfacing with any appropriate cable type, such as an electrical cable or an optical cable. The communication circuit 110 may be configured to use any one or more communication technology and associated protocols (e.g., Ethernet, Bluetooth®, Wi-Fi®, WiMAX, near field communication (NFC), etc.). The communication circuit 110 may be located on silicon separate from the processor 102, or the communication circuit 110 may be included in a multi-chip package with the processor 102, or even on the same die as the processor 102. The communication circuit 110 may be embodied as one or more add-in-boards, daughtercards, network interface cards, controller chips, chipsets, specialized components such as a field-programmable gate array (FPGA) or application-specific integrated circuit (ASIC), or other devices that may be used by the compute device 102 to connect with another compute device. In some embodiments, communication circuit 110 may be embodied as part of a system-on-a-chip (SoC) that includes one or more processors or included in a multichip package that also contains one or more processors. In some embodiments, the communication circuit 110 may include a local processor (not shown) and/or a local memory (not shown) that are both local to the communication circuit 110. In such embodiments, the local processor of the communication circuit 110 may be capable of performing one or more of the functions of the processor 102 described herein. Additionally or alternatively, in such embodiments, the local memory of the communication circuit 110 may be integrated into one or more components of the compute device 102 at the board level, socket level, chip level, and/or other levels.

The display 112 may be embodied as any type of display on which information may be displayed to a user of the compute device 100, such as a liquid crystal display (LCD), a thin film transistor LCD (TFT-LCD), a light-emitting diode (LED) display, an organic light-emitting diode (OLED) display, and/or other display technology. The display 112 may have any suitable resolution, such as 7680×4320, 3840×2160, 1920×1200, 1920×1080, etc.

The display 112 includes one or more RF transmitters 114 and one or more RF receivers 116. As discussed below in more detail, each RF transmitter 114 transmits an RF signal on a gate line or data line of the display 112, and each RF receiver 116 receives some or all of the RF signal transmitted by the RF transmitter 114. Each RF transmitter 114 may send any suitable RF signal, such as a signal at a frequency between 1 GHz and 1 THz. Each RF transmitter 114 may send, e.g., a sine wave, a pulse, a superposition of sine waves, a phase-varying signal, etc. Each RF transmitter 114 may send a signal at any suitable average or peak power, such as −20 to 20 dBm.

In some embodiments, the compute device 100 may include other or additional components, such as those commonly found in a compute device. For example, the compute device 100 may also have peripheral devices 118, such as a keyboard, a mouse, a speaker, a camera, a microphone, an external storage device, a battery, etc. In some embodiments, the compute device 100 may be connected to a dock that can interface with various devices, including peripheral devices 118.

Figure 2:
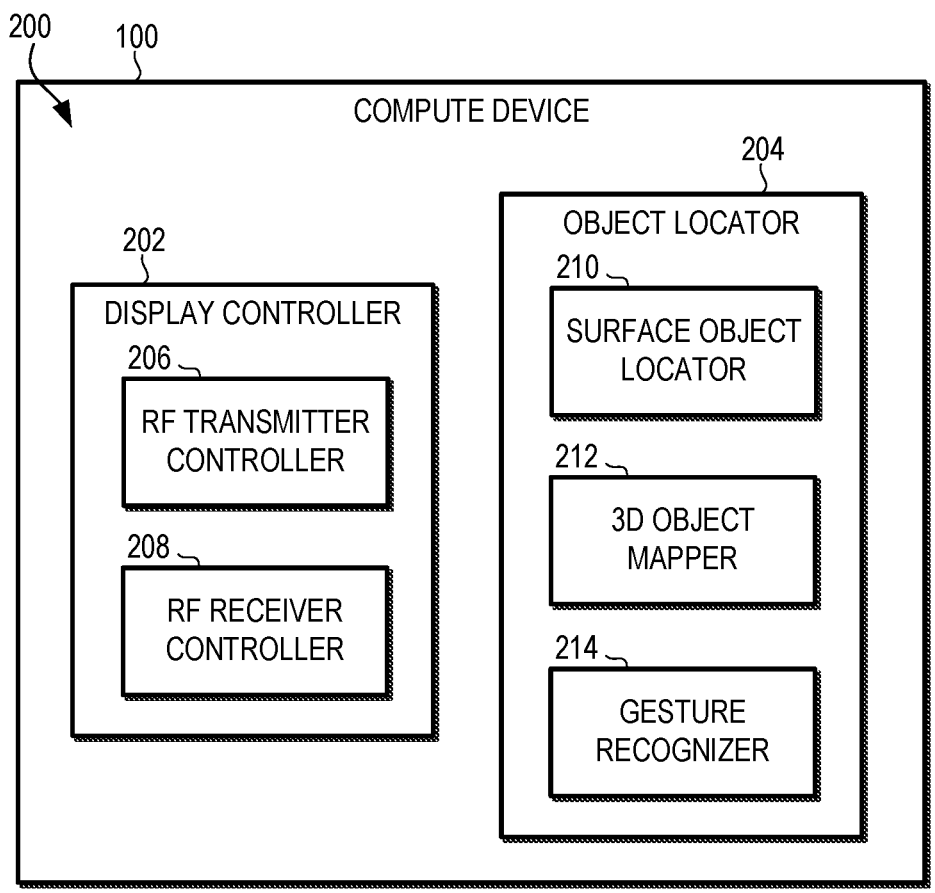
FIG. 2 is a simplified block diagram of at least one embodiment of an environment that may be established by the compute device of FIG. 1.

Referring now to FIG. 2, in an illustrative embodiment, the compute device 100 establishes an environment 200 during operation. The illustrative environment 200 includes a display controller 202 and an object locator 204. The various modules of the environment 200 may be embodied as hardware, software, firmware, or a combination thereof. For example, the various modules, logic, and other components of the environment 200 may form a portion of, or otherwise be established by, the processor 102, the memory 104, the data storage 108, the display 112, or other hardware components of the compute device 100. As such, in some embodiments, one or more of the modules of the environment 200 may be embodied as circuitry or collection of electrical devices (e.g., display controller circuitry 202, object locator circuitry 204, etc.). It should be appreciated that, in such embodiments, one or more of the circuits (e.g., the display controller circuitry 202, the object locator circuitry 204, etc.) may form a portion of one or more of the processor 102, the memory 104, the I/O subsystem 106, the data storage 108, the display 112, and/or other components of the compute device 100. For example, in some embodiments, some or all of the modules may be embodied as the processor 102 as well as the memory 104 and/or data storage 108 storing instructions to be executed by the processor 102. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 102 or other components of the compute device 100. It should be appreciated that some of the functionality of one or more of the modules of the environment 200 may require a hardware implementation, in which case embodiments of modules that implement such functionality will be embodied at least partially as hardware.

Figure 3:
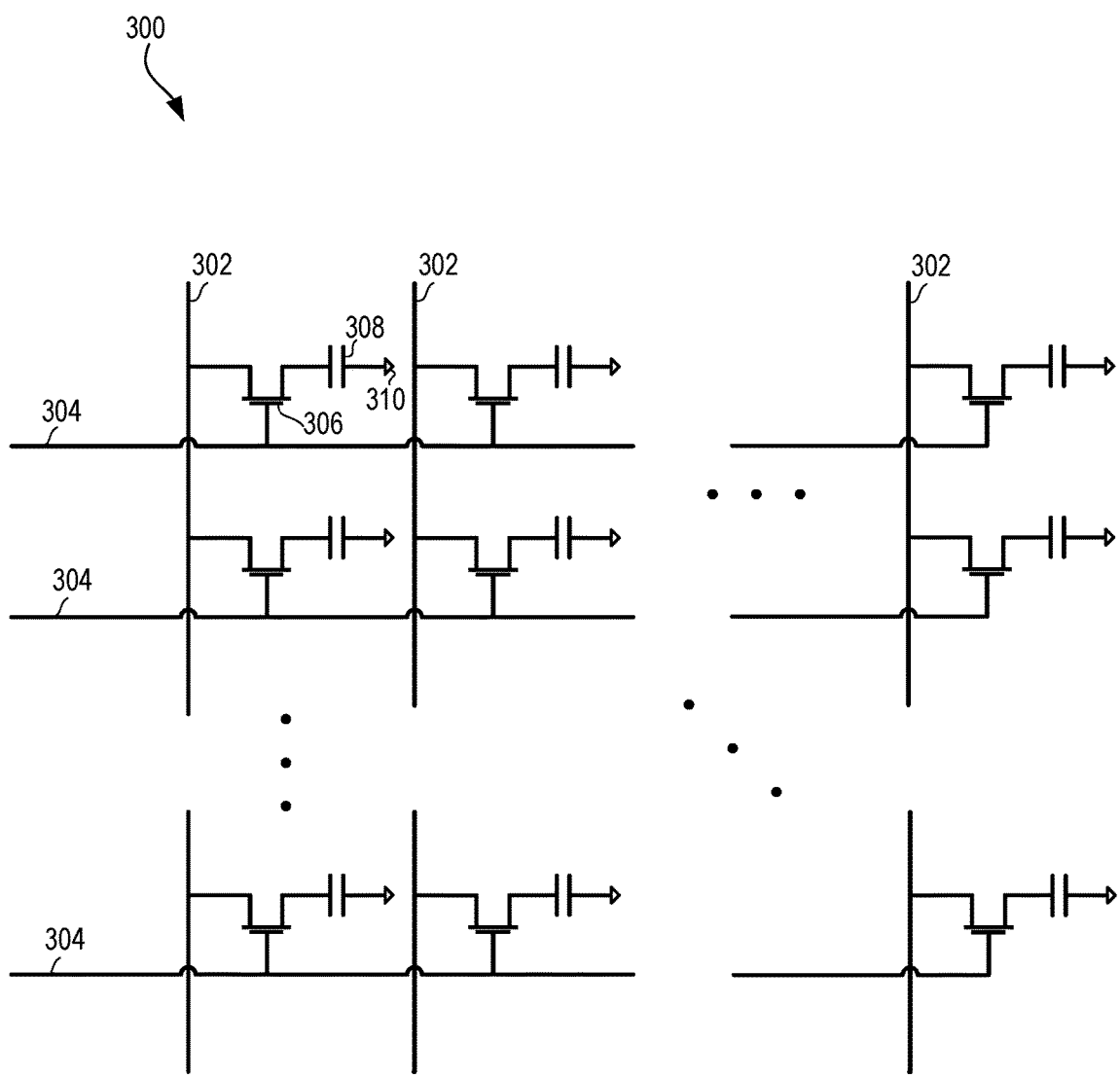
FIG. 3 is a simplified diagram showing a circuit for a display device of the compute device of FIG. 1.

The display controller 202, which may be embodied as hardware, firmware, software, virtualized hardware, emulated architecture, and/or a combination thereof, as discussed above, is configured to control the display 112. One simplified model of a circuit 300 of part of a display 112 is shown in FIG. 3. The circuit 300 includes an array of data lines 302 and an array of gate lines 304. In use, a gate line 304 is activated, turning on a transistor 306 for each data line 302 in the selected gate line 304. The data line 302 can then write data to a cell or pixel of the display 112, such as by charging a capacitor 308 connected across a ground 310 to a particular level. The capacitor 308 may, e.g., control a liquid crystal or may be replaced by an electrode to drive an LED. The display controller 202 can control the array of display lines 302, 304 of the circuit 300 to display an image on the display 112.

Figure 4:
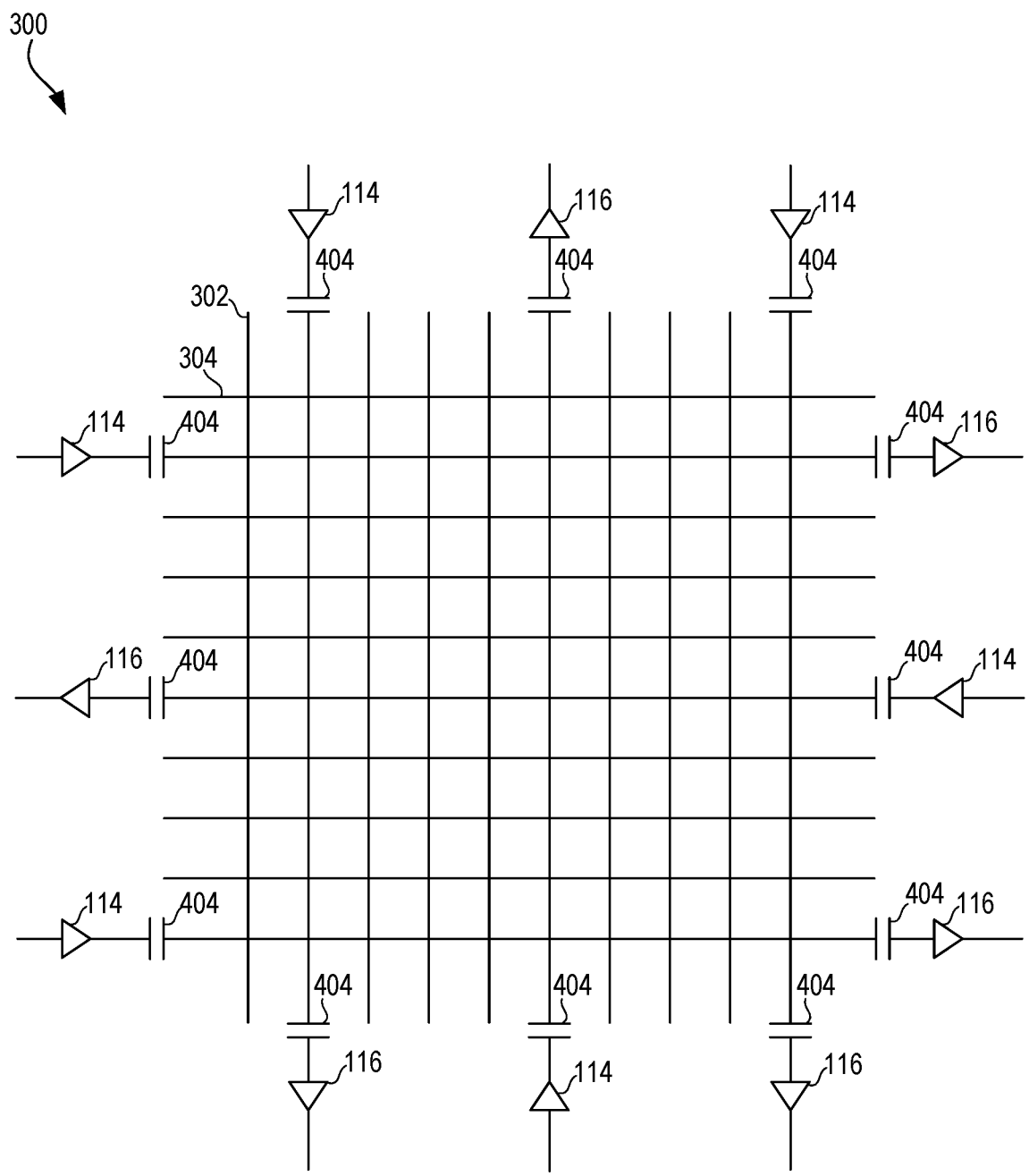
FIG. 4 is a simplified diagram showing RF transmitters and receivers on display lines of a display device of FIG. 1.

The display controller 202 includes an RF transmitter controller 206 and an RF receiver controller 208. In use, the RF transmitter controller 206 controls the RF transmitters 114 of the display 112. A simplified model of the circuit 300 including the RF transmitters 114 and RF receivers 116 is shown in FIG. 4 (the transistors 306 and capacitors 308 are not shown in the interest of clarity). RF transmitters 114 and/or RF receivers 116 may be connected to each display line 302, 304 or may be connected to some of the display lines 302, 304, such as every fourth display line 302, 304. Capacitors 404 can allow the RF signals to be separated from or combined with display signals on the display lines 302, 304. Additional components such as a filter, bias tee, etc., may be used to separate the RF signals from the display signals on the display lines 302, 304. As the signals to control the display cells on the display line 302, 304 is relatively low frequency (e.g., kilohertz to megahertz), the higher-frequency signals from the RF transmitter 114 can be separated.

In use, an RF signal transmitted by an RF transmitter 114 on one display line 302, 304 will couple to the whole structure, due to the high frequency of the RF signal. The display lines 302, 304 act in a similar manner as a monopole or dipole antenna, and the RF signal will radiate in the near field of the display 112. The scattering parameters (or S-parameters) of a scattering matrix (or S-matrix) describing how the RF signal is scattered from a transmitter 114 on one display line 302, 304 to receivers 116 on other display lines 302, 304 will depend on the environment around the display 112, as conductive and/or dielectric material near the display 112 will impact the S-parameters, such as the S11 parameter. The change in S-parameters will depend on the material, shape, position, orientation, etc., of one or more objects near the display 112.

Figure 5:
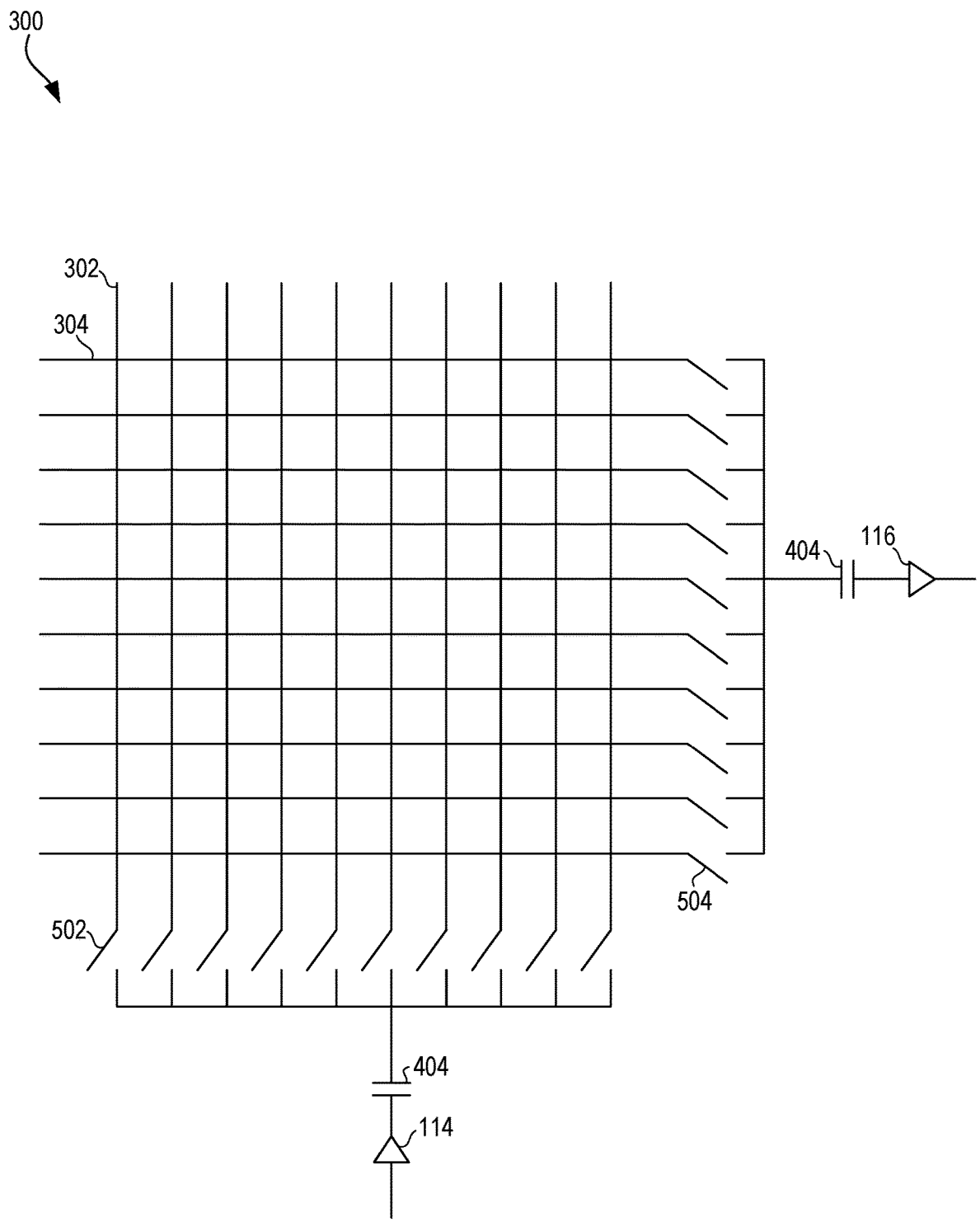
FIG. 5 is a simplified diagram showing a switched RF transmitter and a switched RF receiver on display lines of a display device of FIG. 1.

The RF transmitter controller 206 transmits RF signals on one or more display lines 302, 304. The RF transmitter controller 206 may, e.g., change which display line 302, 304 a signal is sent on, may change the frequency or amplitude of the signal, may change the phase of the signal, etc. In some embodiments, a signal from one RF transmitter 114 can be multiplexed or scanned onto several display lines 302, 304 using one or more switches 502, as shown in FIG. 5. Similarly, one RF receiver 116 can be multiplexed or scanned onto several display lines 302, 304 using one or more switches 504.

The RF receiver controller 208 receives signals from one or more RF receivers 116. The signals from the RF receivers 116 may indicate a frequency, time, phase, amplitude, etc., of signals received on the display lines 302, 304.

The object locator 204, which may be embodied as hardware, firmware, software, virtualized hardware, emulated architecture, and/or a combination thereof, as discussed above, is configured to locate one or more objects near the display 112 based on the RF signals received by the RF receivers 116. The object locator 204 may calculate S-parameters that describe coupling of RF signals between the display lines 302, 304. The object locator 204 may use the received RF signals and/or the S-parameters to determine the location of one or more objects touching the surface of the display 112 or near the display lines 302, 304. The object locator 204 may analyze the RF signals and/or S-parameters in any suitable manner. For example, the object locator 204 may determine signals based on one or a group of S-parameters that indicate the presence of an object at a particular location. In the illustrative embodiment, the object locator 204 may locate one or more objects to within a fraction of a wavelength of the RF signal, such as to within $\frac{1}{10}$ of the wavelength. As such, in the illustrative embodiment, in order to locate a finger within, e.g., 1 millimeter, the object locator 204 may use an RF signal with a wavelength of less than 10 millimeters.

In some embodiments, the object locator 204 may use a machine-learning-based algorithm to process the RF signals and/or the S-parameters to determine the location of one or more objects. For example, a machine-learning-based algorithm may use a data set of received RF signals and/or S-parameters for known objects at known positions to train the machine-learning-based algorithm. The trained machine-learning-based algorithm may then be used to recognize objects and the positions of objects based on the RF signals and/or S-parameters. Any suitable machine-learning-based algorithm may be used, such as a neural network, a random forest, a support vector machine, etc.

The object locator 204 may use the RF signals and/or the S-parameters to determine a location on the display 112 of one or more fingers. Additionally or alternatively, the object locator 204 may determine a location of one or more fingers near the display 112, such as a finger that is hovering but not touching the display 112. The object locator 204 may determine the presence of a head of the user of the compute device 100, such as when the user is holding the compute device 100 near the user's head for a phone call. In some embodiments, the object locator 204 can map a 3D image of one or more objects near the display 112. The object locator 204 may recognize a gesture based on the RF signals and/or the S-parameters. For example, the object locator 204 may recognize a single-finger gesture such as a swipe, may recognize a multi-finger gesture such as a pinch, may recognize a 3D gesture such as a wave, etc.

After locating one or more objects, the object locator 204 may take an action in response. For example, the object locator 204 may trigger a selection of a component on the screen based on a touch (or, e.g., a hover near the screen), change an element of a user interface based on a swipe, turn off the display based on a detection of a user's head, or perform an action in response to detection of a gesture.

Figure 6:
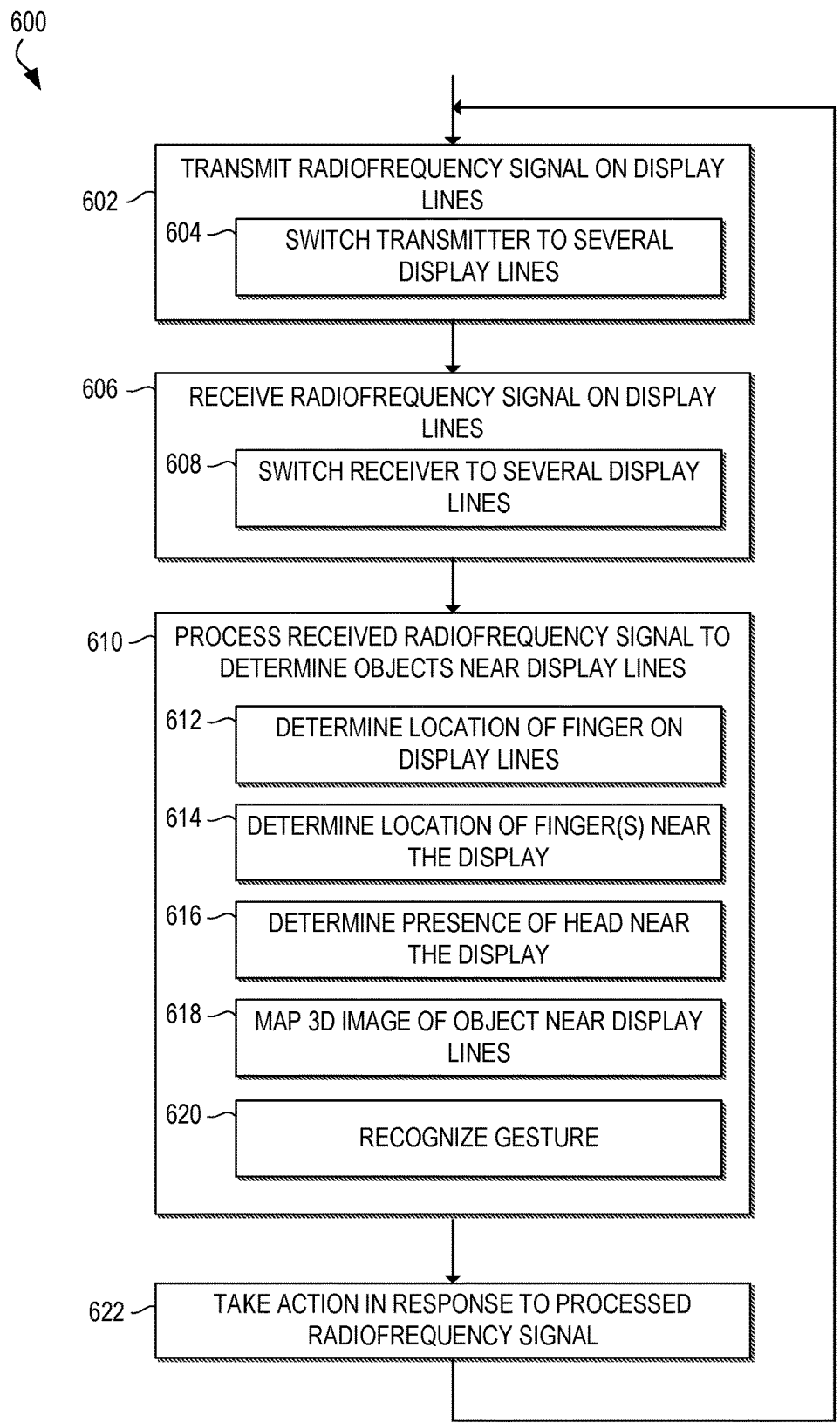
FIG. 6 is a simplified flow diagram of at least one embodiment of a method for RF touch and gesture recognition that may be executed by the compute device of FIG. 1.

Referring now to FIG. 6, in use, the compute device 100 may execute a method 600 for RF touch and gesture recognition. The method 600 begins in block 602, in which the compute device 100 transmits RF signals on display lines 302, 304 using one or more RF transmitters 114. The compute device 100 may transmit RF signals at any suitable frequency, such as 1 GHz to 1 THz. In the illustrative embodiment, the compute device 100 transmits RF signals with a frequency of tens of gigahertz. The compute device 100 may transmit, e.g., a sine wave, a pulse, a superposition of sine waves, a phase-varying signal, etc. The compute device may send a signal at any suitable average or peak power, such as −20 to 20 dBm. In some embodiments, in block 604, the compute device 100 may switch an RF transmitter 114 to several display lines 302, 304, such as by using one or more switches 502.

In block 606, the compute device 100 receives RF signals on display lines 302, 304 using one or more RF receivers 116. The signals from the RF receivers 116 may indicate a frequency, time, phase, amplitude, etc., of signals received on the display lines 302, 304. In some embodiments, in block 608, the compute device 100 may switch an RF receiver 116 to several display lines 302, 304, such as by using one or more switches 504.

In block 610, the compute device 100 processes the received RF signals to determine objects near the display lines 302, 304. The compute device 100 may calculate S-parameters that describe coupling of RF signals between the display lines 302, 304. The compute device 100 may use the received RF signals and/or the S-parameters to determine the location of one or more objects touching or near the display lines 302, 304. The compute device 100 may analyze the RF signals and/or S-parameters in any suitable manner. For example, the compute device 100 may determine signals based on one or a group of S-parameters that indicate the presence of an object at a particular location. In the illustrative embodiment, the compute device 100 may locate one or more objects to within a fraction of a wavelength of the RF signal, such as to within ⅒ of the wavelength. As such, in the illustrative embodiment, in order to locate a finger within, e.g., 1 millimeter, the compute device 100 may use an RF signal with a wavelength of less than 10 millimeters.

In some embodiments, the compute device 100 may use a machine-learning-based algorithm to process the RF signals and/or the S-parameters to determine the location of one or more objects. For example, a machine-learning-based algorithm may use a data set of received RF signals and/or S-parameters for known objects at known positions to train the machine-learning-based algorithm. The trained machine-learning-based algorithm may then be used to recognize objects and the positions of objects based on the RF signals and/or S-parameters. Any suitable machine-learning-based algorithm may be used, such as a neural network, a random forest, a support vector machine, etc.

The compute device 100 may use the RF signals and/or the S-parameters to determine a location on the display 112 of one or more fingers of a user in block 612. The compute device 100 may determine a location of one or more fingers near the display 112 in block 614, such as a finger that is hovering but not touching the display 112. In block 616, the compute device 100 may determine the presence of a head of the user of the compute device 100, such as when the user is holding the compute device 100 near the user's head for a phone call. In block 618, the compute device 100 can map a 3D image of one or more objects near the display 112. In block 620, the compute device 100 may recognize a gesture based on the RF signals and/or the S-parameters. For example, the compute device 100 may recognize a single-finger gesture such as a swipe, may recognize a multi-finger gesture such as a pinch, may recognize a 3D gesture such as a wave, etc.

In block 622, the compute device 100 may take an action in response to the processed RF signal. For example, the compute device 100 may trigger a selection of a component on the screen based on a touch, change an element of a user interface based on a swipe, turn off the display based on a detection of a user's head, or perform an action in response to detection of a gesture. The method 600 then returns to block 602 to continue to transmit RF signals on the display lines 302, 304.

EXAMPLES

Illustrative examples of the technologies disclosed herein are provided below. An embodiment of the technologies may include any one or more, and any combination of, the examples described below.

Example 1 includes a compute device comprising a display comprising a plurality of display lines, wherein individual display lines of the plurality of display lines drive pixels of the display; one or more radiofrequency (RF) transmitters connected to one or more display lines of the plurality of display lines; and one or more radiofrequency (RF) receivers connected to one or more display lines of the plurality of display lines; display controller circuitry to transmit an RF signal on one or more display lines of the plurality of display lines; and receive a scattered RF signal on one or more display lines of the plurality of display lines, and object locator circuitry to determine, based on the scattered RF signal, a location of an object near the plurality of display lines.

Example 2 includes the subject matter of Example 1, and wherein to transmit the RF signal comprises to modulate a frequency and or phase of the RF signal.

Example 3 includes the subject matter of any of Examples 1 and 2, and wherein the object locator circuitry is further to determine one or more scattering parameters based on the scattered RF signal, wherein to determine the location of the object comprises to determine the location of the object based on the one or more scattering parameters.

Example 4 includes the subject matter of any of Examples 1-3, and wherein to determine the location of the object comprises to determine the location of a finger of a user of the compute device on a surface of the display.

Example 5 includes the subject matter of any of Examples 1-4, and wherein to determine the location of the object comprises to determine the location of a finger of a user of the compute device hovering over a surface of the display.

Example 6 includes the subject matter of any of Examples 1-5, and wherein the object locator circuitry is further to determine a location of two or more fingers of a user of the compute device based on the scattered RF signal.

Example 7 includes the subject matter of any of Examples 1-6, and wherein a frequency of the RF signal is between 10 and 100 gigahertz.

Example 8 includes the subject matter of any of Examples 1-7, and wherein the object locator circuitry is further to map a 3D object based on the scattered RF signal.

Example 9 includes the subject matter of any of Examples 1-8, and wherein to transmit the RF signal comprises to scan an output of an RF transmitter on two or more display lines of the plurality of display lines.

Example 10 includes the subject matter of any of Examples 1-9, and wherein to receive the scattered RF signal comprises to scan an input of an RF receiver on two or more display lines of the plurality of display lines.

Example 11 includes the subject matter of any of Examples 1-10, and wherein the object locator circuitry is further to recognize a gesture based on the location of the object.

Example 12 includes the subject matter of any of Examples 1-22, and the display further comprising one or more capacitors to couple the RF signal onto one or more display lines of the plurality of display lines.

Example 13 includes a method comprising transmitting, by a compute device, a radiofrequency (RF) signal on one or more display lines of a plurality of display lines of a display of the compute device, wherein individual display lines of the plurality of display lines drive pixels of the display; receiving, by the compute device, a scattered RF signal on one or more display lines of the plurality of display lines; and determining, by the compute device and based on the scattered RF signal, a location of an object near the plurality of display lines.

Example 14 includes the subject matter of Example 13, and wherein transmitting the RF signal comprises modulating a frequency and or phase of the RF signal.

Example 15 includes the subject matter of any of Examples 13 and 14, and further including determining, by the compute device, one or more scattering parameters based on the scattered RF signal, wherein determining the location of the object comprises determining the location of the object based on the one or more scattering parameters.

Example 16 includes the subject matter of any of Examples 13-15, and wherein determining the location of the object comprises determining the location of a finger of a user of the compute device on a surface of the display.

Example 17 includes the subject matter of any of Examples 13-16, and wherein determining the location of the object comprises determining the location of a finger of a user of the compute device hovering over a surface of the display.

Example 18 includes the subject matter of any of Examples 13-17, and further including determining, by the compute device, a location of two or more fingers of a user of the compute device based on the scattered RF signal.

Example 19 includes the subject matter of any of Examples 13-18, and wherein a frequency of the RF signal is between 10 and 100 gigahertz.

Example 20 includes the subject matter of any of Examples 13-19, and further including mapping, by the compute device, a 3D object based on the scattered RF signal.

Example 21 includes the subject matter of any of Examples 13-20, and wherein transmitting the RF signal comprises scanning an output of an RF transmitter on two or more display lines of the plurality of display lines.

Example 22 includes the subject matter of any of Examples 13-21, and wherein receiving the scattered RF signal comprises scanning an input of an RF receiver on two or more display lines of the plurality of display lines.

Example 23 includes the subject matter of any of Examples 13-22, and further including recognizing, by the compute device, a gesture based on the location of the object.

Example 24 includes a compute device comprising means for transmitting a radiofrequency (RF) signal on one or more display lines of a plurality of display lines of a display of the compute device, wherein individual display lines of the plurality of display lines drive pixels of the display; means for receiving a scattered RF signal on one or more display lines of the plurality of display lines; and means for determining, based on the scattered RF signal, a location of an object near the plurality of display lines.

Example 25 includes the subject matter of Example 24, and wherein the means for transmitting the RF signal comprises means for modulating a frequency and or phase of the RF signal.

Example 26 includes the subject matter of any of Examples 24 and 25, and further including means for determining one or more scattering parameters based on the scattered RF signal, wherein the means for determining the location of the object comprises means for determining the location of the object based on the one or more scattering parameters.

Example 27 includes the subject matter of any of Examples 24-26, and wherein the means for determining the location of the object comprises means for determining the location of a finger of a user of the compute device on a surface of the display.

Example 28 includes the subject matter of any of Examples 24-27, and wherein the means for determining the location of the object comprises means for determining the location of a finger of a user of the compute device hovering over a surface of the display.

Example 29 includes the subject matter of any of Examples 24-28, and further including means for determining a location of two or more fingers of a user of the compute device based on the scattered RF signal.

Example 30 includes the subject matter of any of Examples 24-29, and wherein a frequency of the RF signal is between 10 and 100 gigahertz.

Example 31 includes the subject matter of any of Examples 24-30, and further including means for mapping a 3D object based on the scattered RF signal.

Example 32 includes the subject matter of any of Examples 24-31, and wherein the means for transmitting the RF signal comprises means for scanning an output of an RF transmitter on two or more display lines of the plurality of display lines.

Example 33 includes the subject matter of any of Examples 24-32, and wherein the means for receiving the scattered RF signal comprises means for scanning an input of an RF receiver on two or more display lines of the plurality of display lines.

Example 34 includes the subject matter of any of Examples 24-33, and further including means for recognizing a gesture based on the location of the object.

Example 35 includes one or more computer-readable media comprising a plurality of instructions stored thereon that, when executed, causes a compute device to transmit an RF signal on one or more display lines of a plurality of display lines of a display of the compute device; receive a scattered RF signal on one or more display lines of the plurality of display lines; and determine, based on the scattered RF signal, a location of an object near the plurality of display lines.

Example 36 includes the subject matter of Example 35, and wherein to transmit the RF signal comprises to modulate a frequency and or phase of the RF signal.

Example 37 includes the subject matter of any of Examples 35 and 36, and wherein the plurality of instructions further causes the compute device to determine one or more scattering parameters based on the scattered RF signal, wherein to determine the location of the object comprises to determine the location of the object based on the one or more scattering parameters.

Example 38 includes the subject matter of any of Examples 35-37, and wherein to determine the location of the object comprises to determine the location of a finger of a user of the compute device on a surface of the display.

Example 39 includes the subject matter of any of Examples 35-38, and wherein to determine the location of the object comprises to determine the location of a finger of a user of the compute device hovering over a surface of the display.

Example 40 includes the subject matter of any of Examples 35-39, and wherein the plurality of instructions further causes the compute device to determine a location of two or more fingers of a user of the compute device based on the scattered RF signal.

Example 41 includes the subject matter of any of Examples 35-40, and wherein a frequency of the RF signal is between 10 and 100 gigahertz.

Example 42 includes the subject matter of any of Examples 35-41, and wherein the plurality of instructions further causes the compute device to map a 3D object based on the scattered RF signal.

Example 43 includes the subject matter of any of Examples 35-42, and wherein to transmit the RF signal comprises to scan an output of an RF transmitter on two or more display lines of the plurality of display lines.

Example 44 includes the subject matter of any of Examples 35-43, and wherein to receive the scattered RF signal comprises to scan an input of an RF receiver on two or more display lines of the plurality of display lines.

Example 45 includes the subject matter of any of Examples 35-44, and wherein the plurality of instructions further causes the compute device to recognize a gesture based on the location of the object.

Example 46 includes a display comprising a plurality of display lines, wherein individual display lines of the plurality of display lines drive pixels of the display; one or more radiofrequency (RF) transmitters connected to one or more display lines of the plurality of display lines; and one or more radiofrequency (RF) receivers connected to one or more display lines of the plurality of display lines.

Example 47 includes the subject matter of Example 46, and wherein the one or more RF transmitters are to generate an RF signal on one or more display lines of the plurality of display lines, wherein the RF signal has a frequency between 10 and 100 gigahertz.

Example 48 includes the subject matter of any of Examples 46 and 47, and further including one or more switches to multiplex one RF transmitter of the one or more RF transmitters onto two or more display lines of the plurality of display lines.

Example 49 includes the subject matter of any of Examples 46-48, further comprising one or more capacitors to couple an RF signal from the one or more RF transmitters onto one or more display lines of the plurality of display lines.

Example 50 includes a compute device comprising the display of Example 46, the compute device further comprising display controller circuitry to transmit an RF signal on one or more display lines of the plurality of display lines; and receive a scattered RF signal on one or more display lines of the plurality of display lines, and object locator circuitry to determine, based on the scattered RF signal, a location of an object near the plurality of display lines.

The invention claimed is:

1. A compute device comprising:
a display comprising:
a plurality of display lines, wherein individual display lines of the plurality of display lines drive pixels of the display;
one or more radiofrequency (RF) transmitters connected to one or more display lines of the plurality of display lines; and
one or more radiofrequency (RF) receivers connected to one or more display lines of the plurality of display lines;
display controller circuitry to:
transmit an RF signal on one or more display lines of the plurality of display lines; and
receive a scattered RF signal on one or more display lines of the plurality of display lines, and
object locator circuitry to determine, based on the scattered RF signal, a location of an object near the plurality of display lines, wherein to determine the location of the object comprises to determine the location of a finger of a user of the compute device hovering over a surface of the display.

2. The compute device of claim 1, wherein to transmit the RF signal comprises to modulate a frequency and or phase of the RF signal.

3. The compute device of claim 1, wherein the object locator circuitry is further to determine one or more scattering parameters based on the scattered RF signal, wherein to determine the location of the object comprises to determine the location of the object based on the one or more scattering parameters.

4. The compute device of claim 1, wherein to determine the location of the object comprises to determine the location of a finger of a user of the compute device on a surface of the display.

5. The compute device of claim 1, wherein the object locator circuitry is further to determine a location of two or more fingers of a user of the compute device based on the scattered RF signal.

6. The compute device of claim 1, wherein a frequency of the RF signal is between 10 and 100 gigahertz.

7. The compute device of claim 1, wherein the object locator circuitry is further to map a 3D object based on the scattered RF signal.

8. The compute device of claim 1, wherein to transmit the RF signal comprises to scan an output of an RF transmitter on two or more display lines of the plurality of display lines.

9. The compute device of claim 1, wherein to receive the scattered RF signal comprises to scan an input of an RF receiver on two or more display lines of the plurality of display lines.

10. The compute device of claim 1, wherein the object locator circuitry is further to recognize a gesture based on the location of the object.

11. The compute device of claim 1, the display further comprising one or more capacitors to couple the RF signal onto one or more display lines of the plurality of display lines.

12. One or more non-transitory computer-readable media comprising a plurality of instructions stored thereon that, when executed, causes a compute device to:
transmit an RF signal on one or more display lines of a plurality of display lines of a display of the compute device;
receive a scattered RF signal on one or more display lines of the plurality of display lines;
determine, based on the scattered RF signal, a location of an object near the plurality of display lines; and
recognize a gesture based on the location of the object.

13. The one or more non-transitory computer-readable media of claim 12, wherein to transmit the RF signal comprises to modulate a frequency and or phase of the RF signal.

14. The one or more non-transitory computer-readable media of claim 12, wherein the plurality of instructions further causes the compute device to determine one or more scattering parameters based on the scattered RF signal, wherein to determine the location of the object comprises to determine the location of the object based on the one or more scattering parameters.

15. The one or more non-transitory computer-readable media of claim 12, wherein to determine the location of the object comprises to determine the location of a finger of a user of the compute device on a surface of the display.

16. The one or more non-transitory computer-readable media of claim 12, wherein a frequency of the RF signal is between 10 and 100 gigahertz.

17. The one or more non-transitory computer-readable media of claim 12, wherein the plurality of instructions further causes the compute device to map a 3D object based on the scattered RF signal.

18. The one or more non-transitory computer-readable media of claim 12, wherein to transmit the RF signal comprises to scan an output of an RF transmitter on two or more display lines of the plurality of display lines.

19. A compute device comprising:
a display comprising:
a plurality of display lines, wherein individual display lines of the plurality of display lines drive pixels of the display;
one or more radiofrequency (RF) transmitters connected to one or more display lines of the plurality of display lines; and
one or more radiofrequency (RF) receivers connected to one or more display lines of the plurality of display lines;
display controller circuitry to:
transmit an RF signal on one or more display lines of the plurality of display lines; and
receive a scattered RF signal on one or more display lines of the plurality of display lines, and
object locator circuitry to:
determine, based on the scattered RF signal, a location of an object near the plurality of display lines; and
map a 3D object based on the scattered RF signal.

20. The compute device of claim 19, wherein the one or more RF transmitters are to generate an RF signal on one or more display lines of the plurality of display lines, wherein the RF signal has a frequency between 10 and 100 gigahertz.

21. The compute device of claim 19, further comprising one or more switches to multiplex one RF transmitter of the one or more RF transmitters onto two or more display lines of the plurality of display lines.

22. The compute device of claim 19, the display further comprising one or more capacitors to couple an RF signal from the one or more RF transmitters onto one or more display lines of the plurality of display lines.

23. The compute device of claim 19, wherein the object locator circuitry is further to determine a location of two or more fingers of a user of the compute device based on the scattered RF signal.

24. The compute device of claim 19, wherein the object locator circuitry is further to determine one or more scattering parameters based on the scattered RF signal, wherein to determine the location of the object comprises to determine the location of the object based on the one or more scattering parameters.

25. The compute device of claim 19, wherein the object locator circuitry is further to recognize a gesture based on the location of the object.

* * * * *